UNITED STATES PATENT OFFICE.

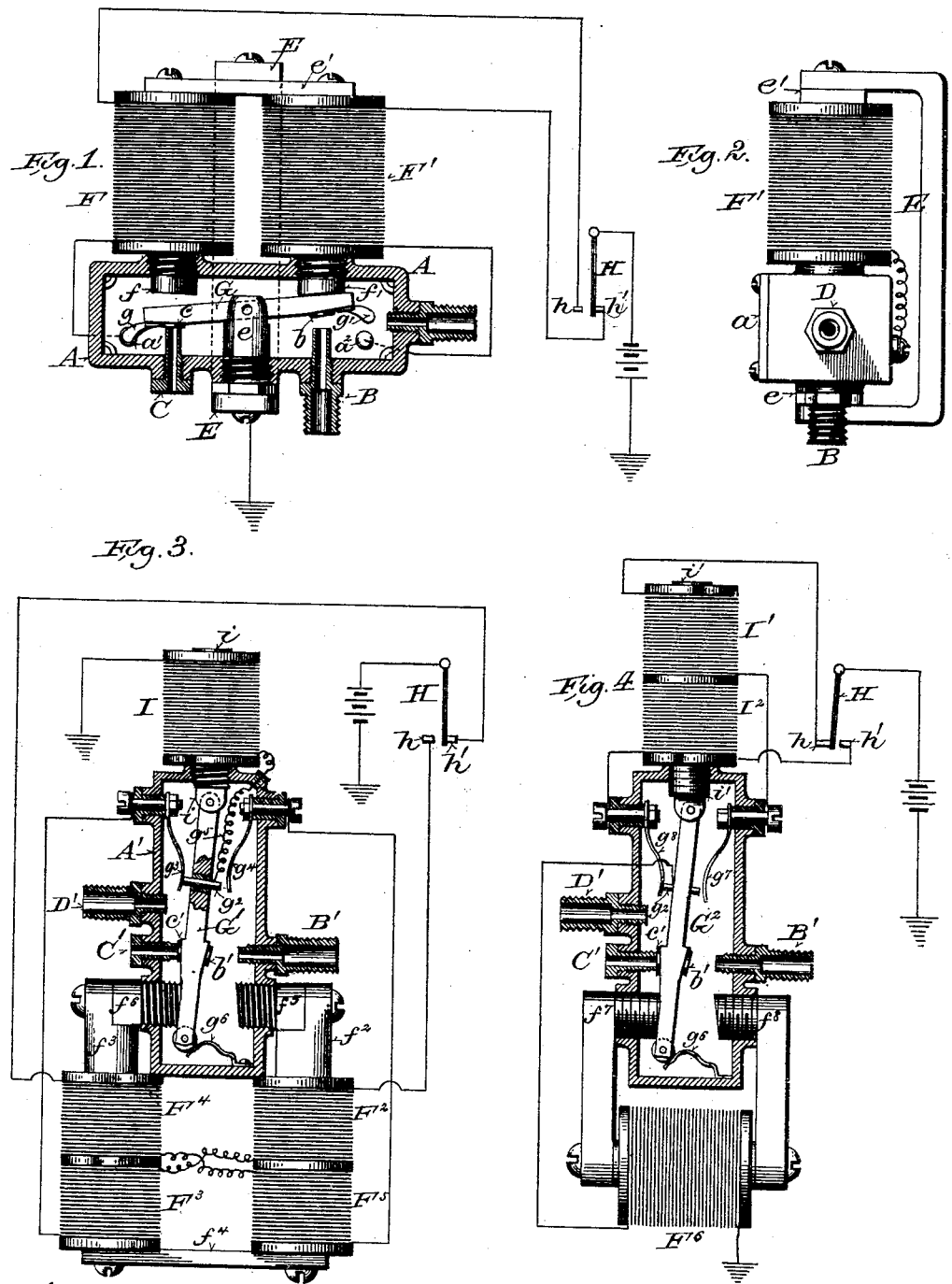

CHARLES L. FORTIER, OF MILWAUKEE, WISCONSIN.

VALVE-CONTROLLER.

SPECIFICATION forming part of Letters Patent No. 479,795, dated August 2, 1892.

Application filed March 5, 1892. Serial No. 423,820. (No model.)

*To all whom it may concern:*

Be it known that I, CHARLES L. FORTIER, of Milwaukee, in the county of Milwaukee and State of Wisconsin, have invented certain new and useful Improvements in Electric Valves; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to increase the efficiency of a given electric current in the operation of valves and the like for various purposes, such as heat-regulation, &c.

It consists, essentially, of two magnets arranged to mutually act upon each other, one being movable and provided or connected with the valve or part to be shifted and one being provided with coils wound in opposite directions, and of certain other novel features of construction and arrangement hereinafter particularly described, and pointed out in the claims.

In the accompanying drawings like letters designate the same parts in the several figures.

Figure 1 is a view, partly in elevation and partly in section, of a valve embodying my improvements. Fig. 2 is an elevation of the same, viewed at right angles to its position shown in Fig. 1. Fig. 3 is a view similar to that shown in Fig. 1 of a modified form of the valve, and Fig. 4 is a similar view of another modification thereof.

The various forms of valves herein shown and described are particularly designed to control fluid-pressure for the operation of valves in apparatus for heat-regulation or other purposes.

Referring to Figs. 1 and 2, A represents a valve-case, which may be made of any suitable material and of any desired form. It is constructed with a cover or removable section *a*, detachably fastened thereto, as shown in Fig. 2, for the purpose of affording access to the internal parts. It is provided with suitable supply and exhaust connections and a connection with the diaphragm chamber or cylinder of the valve or mechanism operated by the medium controlled by my electrical valve.

B is the supply connection, C the exhaust, and D the connection with the valve or mechanism to be operated. These several connections may be screw-threaded in the case, so as to form tight joints therewith, and the connections B and D may be formed or provided with half-unions for connection with pipes.

E represents an extended U-shaped steel or permanent magnet, to one leg of which is attached the pole-piece *e* and to the other leg the yoke *e'*, connecting the cores *f f'* of an electro-magnet F F'. The pole-piece *e* and the cores *f f'*, serving in effect as opposite poles of the permanent magnet, are, like the connections B, C, and D, screw-threaded into the case A on opposite sides thereof, so as to form tight joints therewith, as shown in Fig. 1. The pole-piece *e* is located between the supply and exhaust connections B and C and between the cores *f f'*, which project into the valve-chamber on the opposite side of the case. In the pole-piece *e* within said chamber is pivoted the soft-iron armature G, which is provided with disks of patent-leather or other suitable material, arranged to close against the inner ends of the connections B and C and serve as valves for the same. It is also provided with electrical contact springs or pieces *g g'*, which are arranged to engage alternately with corresponding contact-pieces *a'* *a²*, attached to the inside of case A and suitably insulated therefrom. The pole-pieces, armature, and electrical contacts and connections within the valve-case may be plated in any suitable manner to prevent corrosion and actual contact of the iron parts. The coils F F' of the electro-magnet are wound in opposite directions upon the cores *f f'*, and the coil F is connected at one end with the contact-piece *a'* in the valve-case and at the opposite end by a suitable conductor with the contact-point *h* of a thermostat H or other circuit-controlling device, and the coil F' is connected at one end with the contact-piece *a²* and at the opposite end with the opposite contact-point *h'* of the thermostat. The movable contact of the thermostat is connected with one pole of the battery, the opposite pole of which has a ground connection. The pole-piece $e$ of the permanent magnet also has a ground connection.

My improved valve, as above described, operates as follows: The cores $f f'$ and the pivoted armature G are normally magnetized with opposite polarities by the permanent magnet E, and whichever end of the armature is nearer either of the cores $f f'$, constituting the opposite poles, will by reason of its proximity therewith be drawn to and held in contact with the same. When the armature is in contact with the core $f'$, as shown in Fig. 1, the contact-piece $g$ at its opposite end will be in engagement with the contact-piece $a'$, in connection with the coil F of the electro-magnet. Suppose now that the circuit is closed by the thermostat H or by any other form of circuit-controlling device employed through the coil F. The electro-magnet will be energized in such a manner as to increase the strength of the core $f$ and neutralize or reverse the effect of the core $f'$ produced by the permanent magnet E. The armature G being now of the same polarity as the core $f'$ and of opposite polarity to that of the core $f$, will be unaffected or repelled by the former and attracted by the latter. Consequently its position will be instantly shifted, breaking the contact between $a'$ and $g$ and establishing connection between the contact-pieces $a^2$ and $g'$ and at the same time closing the supply connection B and opening the exhaust connection C into the valve-chamber, and thus opening communication between the connections C and D. The circuit being broken through the coil F, the armature will be held in contact with the core $f$, the valve $b$ closed, and the valve $c$ opened, in the manner above described, by the permanent magnet E. When the circuit is again closed by the thermostat H through the coil F', the current tends to reverse the polarity of the cores $f f'$, augmenting in core $f'$ and neutralizing or overbalancing in core $f$ the effect of the permanent magnet E. The polarity thus produced in core $f$ being neutral or like and that of core $f'$ being opposite the constant polarity induced by the permanent magnet in armature G, the latter will be again shifted, making contact between $a'$ and $g$ and breaking contact between $a^2$ and $g'$, thus breaking the circuit through coil F'. The supply connection B is now opened into the valve-chamber by the withdrawal of valve $b$, and the exhaust connection C is closed by the seating of valve $c$, thus opening communication between the connections B and D. The armature, with valves $b$ and $c$, will be held in the positon last mentioned, and shown in Fig. 1, by the permanent magnet, in the manner hereinbefore explained, until the circuit is again closed through coil F.

By the employment of the differential winding of the electro-magnet its polarity may be reversed without the use of a pole-changer, and by the use of the permanent magnet in connection with the differentially-wound electro-magnet I am enabled to dispense with springs for retracting the armature or holding it in place after it has been shifted. In this manner the permanent magnet augments the mechanical effect of the electro-magnet and I am enabled to accomplish the desired result with a comparatively weak current.

Referring to Fig. 3, illustrating a modification of the device, in place of the permanent magnet in connection with an electro-magnet I employ two electro-magnets, one differentially wound and the other plain wound. Cores $f^2 f^3$ are connected by a yoke $f^4$ at one end and provided at the opposite ends with pole-pieces $f^5 f^6$, projecting into the valve-case A' at or near one end thereof. The coils $F^2 F^3$ and $F^4 F^5$, wound in opposite directions upon opposite cores and connected in pairs, are arranged to reverse the polarity of the cores when the current is shifted from one set of coils through the other. The armature G' is pivoted at one end to the core $i$ of an electro-magnet I and projects at its free end between the pole-pieces $f^5 f^6$ of the other magnet. It is provided on opposite sides with valve-disks $b'$ and $c'$, of suitable material, arranged to alternately close against the inwardly-projecting ends of the supply and exhaust connections B' C'. It is provided at an intermediate point with a contact-piece $g^2$, suitably insulated therefrom and connected by a wire $g^5$, passing through and insulated from the valve-case, with one end of the coil I, the other end of said coil having a ground connection. One pair of coils $F^2 F^3$ of the other magnet has one of its terminals connected with a spring $g^3$, attached to the inside of the valve-case and suitably insulated therefrom, the other terminal of said coils being connected with the contact-point $h$ of a thermostat H or other suitable circuit-controlling device. One terminal of the other pair of coils $F^4 F^5$ is connected with a contact-spring $g^4$, attached to the opposite side of the valve-case, while the other terminal of said coils is connected with the opposite contact-point $h'$ of the thermostat or other circuit-controlling device. The contact-springs $g^3 g^4$ are arranged on opposite sides of the armature G' in position to be engaged alternately by the contact-piece $g^2$. A spring $g^6$, against which a friction-roller in the free end of the armature G' presses, holds said armature in either its right or left position when the circuit is broken through the magnets.

This form of my improved valve operates as follows: The circuit having previously been closed through the contact-point $h'$ of the thermostat and the coils $F^4$, $F^5$, and I and the current having thus induced a polarity in core $f^5$ like and in core $f^6$ unlike the polarity induced in the armature G', the latter has been shifted and left in the position in which it is shown adjacent to the pole-piece $f^6$, where it is held by the spring $g^6$, with the valve $c'$ closing the exhaust connection C', and free communication between the connections B′ and D′. If now the circuit is closed through the coils F², F³, and I, the current will produce the same polarity in the armature G′ as before, but will reverse the polarity of the pole-pieces $f^5 f^6$, and thus shift said armature to the right, breaking the electrical connection between the spring $g^3$ and the contact-piece $g^2$ and establishing connection between the latter and the spring $g^4$. At the same time the exhaust connection C′ of the valve will be opened and the supply connection B′ closed, thus permitting the air or other actuating medium to escape from the valve, to be operated through its connection D′.

Referring to Fig. 4, illustrating another modification of the device, in which two electro-magnets are employed, the magnet connected with the armature is in this case differentially wound, so as to reverse its polarity instead of the polarity of the poles by which it is shifted in position. One terminal of the coil I′ of the magnet, connected with the armature G² is connected with the contact-spring $g^7$, while the other terminal is connected with the contact-point $h$ of the thermostat or other circuit-controlling device, and one terminal of the coil I² of said magnet is connected with the opposite contact-spring $g^8$, while its other terminal is connected with the opposite contact-point $h'$ of the thermostat or other circuit-controlling device. One terminal of the coil F⁶ is connected with the insulated contact-piece $g^2$ on the armature, while the other terminal has a ground connection. Otherwise the construction and arrangement of the valve and its connections, as well as its operation, are like or similar to those of the valve shown in Fig. 3.

I claim—

1. In an electric valve, the combination of two magnets arranged to mutually act upon each other, one being movable and provided or connected with the valve or the part to be shifted and one having coils wound in reverse directions, substantially as and for the purposes set forth.

2. In an electric valve, the combination of a valve-case having supply and exhaust connections, an armature within said case, provided with valves controlling said connections, pole-pieces in proximity with said armature, and magnets connected with said pole-pieces and armature, one of said magnets having a differential winding, whereby its polarity may be reversed, substantially as and for the purposes set forth.

3. In an electric valve, the combination of two magnets arranged to mutually act upon each other, one being movable and provided or connected with the valve or part to be shifted and the other having two pole-pieces arranged in proximity therewith, one of said magnets being differentially wound, so as to change its polarity when the current is shifted from one coil through the other, and a circuit-breaker operated by the movable magnet to shift the current alternately through said coils, substantially as and for the purposes set forth.

4. In an electric valve, the combination, with two magnets arranged to mutually act upon each other, one of said magnets being movable and provided or connected with the valve or part to be shifted and one having coils wound in opposite directions, so as to change its polarity, of a circuit-controlling device, the contact-points of which are connected with terminals of said coils, and a circuit-breaker operated by the movable magnet and connected with the other terminals of said coils, substantially as and for the purposes set forth.

5. In an electric valve, the combination of a permanent magnet having a movable armature provided or connected with a valve and mounted upon one leg and two pole-pieces upon the other leg and coils wound in opposite directions on said pole-pieces, substantially as and for the purposes set forth.

6. In an electric valve, the combination of a suitable case provided with supply and exhaust connections, a permanent magnet provided on one leg with two pole-pieces projecting into said case and on the other leg with a movable armature within said case, coils wound in opposite directions on said pole-pieces, and a circuit-breaker by which the circuit is closed alternately through said coils, substantially as and for the purposes set forth.

7. In an electric valve, the combination of a suitable case, a permanent magnet having three pole-pieces projecting into said case, one of said pole-pieces having a movable part provided or connected with the valve or part to be shifted and the other two pole-pieces having coils wound thereon in opposite directions, contact-pieces with which terminals of said coils are connected, arranged to be engaged alternately by the movable part of the magnet, and a circuit-controlling device arranged to direct the current through either of said coils, substantially as and for the purposes set forth.

8. In an electric valve, the combination of a valve-case having induction and eduction connections, an armature provided with a valve or valves controlling said connections, a pole-piece in proximity with said armature, and a differentially-wound coil arranged to reverse the polarity of said pole-piece, substantially as and for the purposes set forth.

9. In an electric valve, the combination of a valve-case having suitable connections, a permanent magnet outside of said case having a pole or poles projecting into the same, a movable magnet provided or connected with a valve, and means for changing the polarity of one of said magnets, substantially as and for the purposes set forth.

10. In an electric valve, the combination of a valve-case having suitable connections and one or more valves controlling said connections, a permanent magnet outside of said case, a movable magnet within the case, connected with and arranged to operate said valve or valves and located in the field of said permanent magnet, and means for changing the polarity of one of said magnets.

In testimony that I claim the foregoing as my own I affix my signature in presence of two witnesses.

CHARLES L. FORTIER.

Witnesses:
CHAS. L. GOSS,
E. G. ASMUS.